W. S. STAPLEY.
GREASE GUN.
APPLICATION FILED JULY 7, 1909.
949,163.
Patented Feb. 15, 1910.
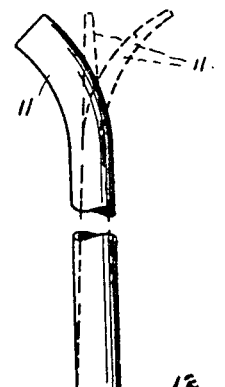
Fig. 1.
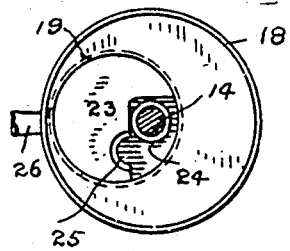
Fig. 2.
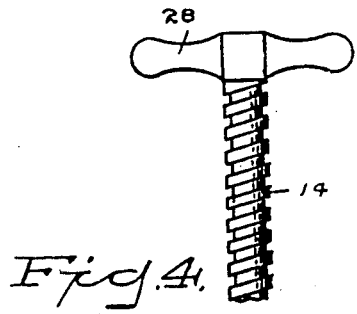
Fig. 4.
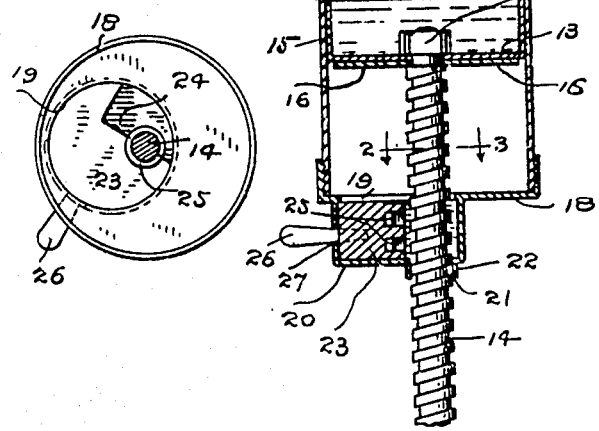
Fig. 3.
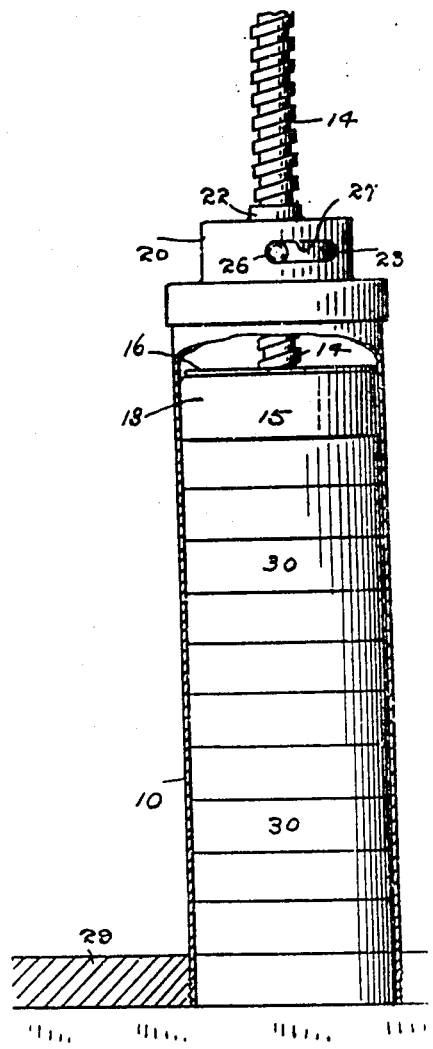
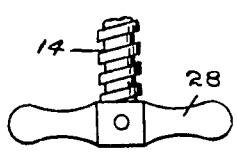
Witnesses:
H. A. Lamb
S. W. Atherton
Inventor
William S. Stapley
By Attorney
A. M. Wooster

UNITED STATES PATENT OFFICE.

WILLIAM S. STAPLEY, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

GREASE-GUN.

949,163.  Specification of Letters Patent. Patented Feb. 15, 1910.

Application filed July 7, 1909. Serial No. 506,317.

*To all whom it may concern:*

Be it known that I, WILLIAM S. STAPLEY, a citizen of the United States, residing at Bridgeport, county of Fairfield, State of Connecticut, have invented an Improvement in Grease-Guns, of which the following is a specification.

This invention relates to the class of grease guns, so called, adapted for use with either hard or soft grease or oil, illustrated and described in my former Letters Patent Number 915,499, dated March 16, 1909, and the invention has for its object to simplify and cheapen the construction and to improve the mode of operation in use.

With these and other objects in view I have devised the novel grease gun which I will now describe, referring to the accompanying drawing forming a part of this specification and using reference characters to indicate the several parts.

Figure 1 is a longitudinal section illustrating my novel grease gun as in use, certain of the parts being in elevation and the cylinder partly filled with soft grease or oil which is being ejected by forward movement of the piston; Fig. 2 a plan view of the interior of the cylinder cap with the screw in section, as on the line 2—3 in Fig. 1, the oscillatory nut being out of engagement with the screw; Fig. 3 a similar view showing the nut in engagement with the screw; and Fig. 4 is an elevation partly in section, the base cap being removed, illustrating the operation of filling the cylinder with hard grease.

10 denotes the cylinder which is provided with a suitable nozzle 11 which may be either curved or straight as indicated respectively by full and dotted lines in Fig. 1. In order to adapt the gun for use with hard grease, the outer or discharge end of the cylinder is provided with a removable cap, indicated by 12, to which the nozzles are removably secured.

13 denotes the piston which is pivotally secured to a screw 14. The special form of piston used is immaterial so far as the present invention is concerned. I have illustrated a piston comprising a steel cup 15 which fits the cylinder closely and is strengthened and supported by a metallic washer 16, said cup and washer being retained on the end of a screw by means of a nut 17, leaving the screw free to rotate independently of the piston. At the base or inner end of the cylinder is a cap 18 having an eccentrically-placed opening 19 through which the screw passes freely.

20 denotes a housing secured eccentrically to cap 18 and covering opening 19, the screw passing through a hole 21 in the top of the housing which is preferably surrounded by a flange 22. Within the housing is an oscillatory nut 23 having an opening 24 through it which is shaped to give clearance to the screw when the nut is turned in one position, as in Fig. 2, and one wall of which is provided with segment threads 25 adapted to engage the threads of the screw when the nut is turned to its operative position, as in Fig. 3. The nut is provided with an operating handle 26 which extends through a slot 27 in the side of the housing, the engagement of the handle with the ends of the slot limiting the movement of the nut in both directions. At the outer end of the screw is a finger piece 28 for convenience in operation.

Suppose the cylinder to be filled with oil or soft grease, as in Fig. 1, and the segment threads of the nut to be in engagement with the screw, as in Fig. 3. Forward rotation of the screw by means of the finger piece will force the piston forward and cause the oil or grease to be forced out through the nozzle. When the screw has been turned entirely in and the piston is at the forward end of the cylinder, the operator, by means of handle 26, disengages the segment threads of the nut from the screw leaving the screw wholly free, as in Fig. 2, so that it will act as an ordinary piston rod, and the piston may be drawn backward by a straight backward pull upon the screw. The cylinder is filled with oil or soft grease by simply inserting the nozzle into the oil or grease in any receptacle and then drawing the piston backward by a direct pull, in the same manner that a piston syringe is filled. When the cylinder is partly or wholly filled with oil or soft grease it may be discharged by moving the segment threads of the nut into engagement with the screw and then rotating the screw forward by means of the finger piece. It will be understood that the nut is moved into or out of engagement with the screw by a simple movement of the operating handle, and that the nut will remain in either position in which it may be placed.

By leaving the nut out of engagement with the screw the cylinder may be filled and discharged the same as an ordinary piston syringe. Ordinarily the cylinder is filled by a direct pull upon the screw when the nut is disengaged therefrom and is discharged by rotation of the screw after the nut has been placed in engagement therewith.

To fill the cylinder with hard grease, the operator removes cap 12 from the discharge end of the cylinder and presses the open end of the cylinder into the grease, which is indicated by 29 in Fig. 4, the end of the cylinder acting to cut out cakes of the grease, which are indicated by 30. As each cake is cut out it lifts the cakes previously cut out upward in the cylinder, as shown in Fig. 4. The operation of discharging hard grease is necessarily performed by rotation of the screw, after the segment thread upon the nut has been placed in engagement therewith.

Having thus described my invention I claim:—

1. A grease gun comprising a cylinder, a cap at the base thereof, an eccentric housing carried by the cap, a piston within the cylinder, a screw by which the piston is carried and which passes through the housing and an oscillatory nut within the housing having an opening through which the screw passes and which in one position of the nut gives clearance to the screw, a wall of said opening being provided with segment threads adapted to engage the threads of the screw.

2. A grease gun comprising a cylinder, a piston, a screw by which the piston is carried and an axially oscillating nut having an opening at one side through which the screw passes, said opening being shaped to give clearance to the screw in one position and a wall of said opening being provided with segment threads which engage the threads of the screw in the operative position of the nut.

3. A grease gun comprising a cylinder, a piston, a screw by which the piston is carried and an axially oscillating nut having an opening at one side and segment threads adapted to engage the threads of the screw.

4. A grease gun comprising a cylinder, an eccentric housing exterior thereto at the base, a piston, a screw by which the piston is carried and which passes through the housing, an oscillatory nut in the housing having an opening through which the screw passes freely and provided with segment threads adapted to engage the threads of the screw and means for oscillating the nut to cause it to engage and disengage the screw.

In testimony whereof I affix my signature in presence of two witnesses.

WILLIAM S. STAPLEY.

Witnesses:
ARTHUR H. MOORE,
WILLIAM S. DOWNS.